Oct. 30, 1934.   K. S. CLAPP   1,978,622
AUTOMATIC CHOCK FOR VEHICLE LIFTS
Original Filed Aug. 18, 1930    3 Sheets-Sheet 1
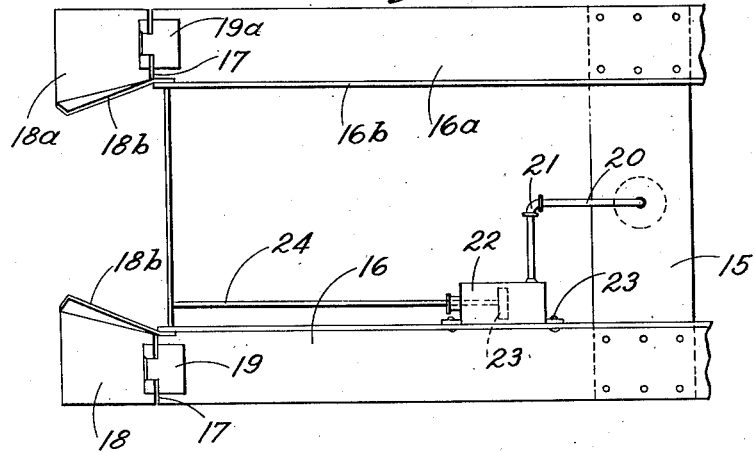
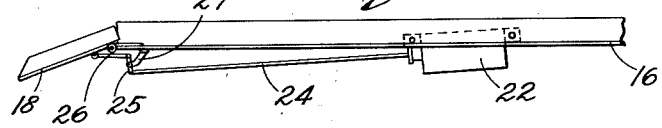
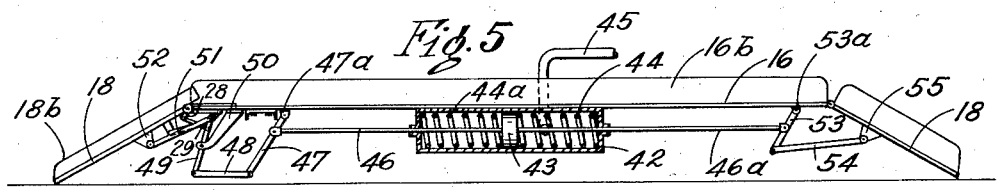
Inventor
KENNETH S. CLAPP

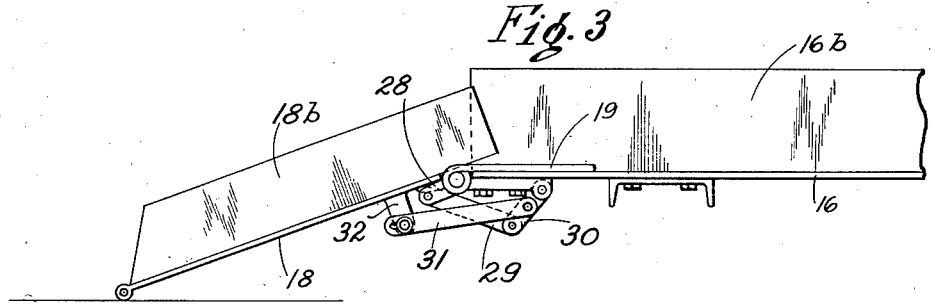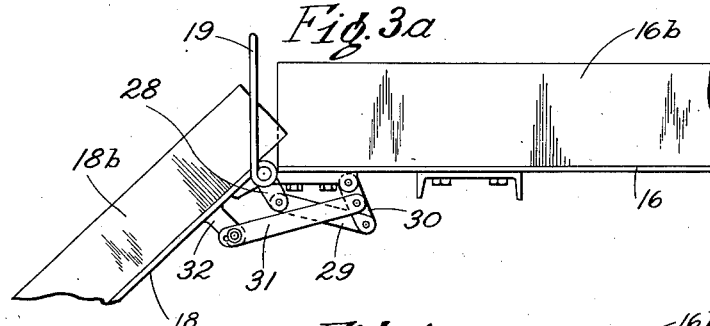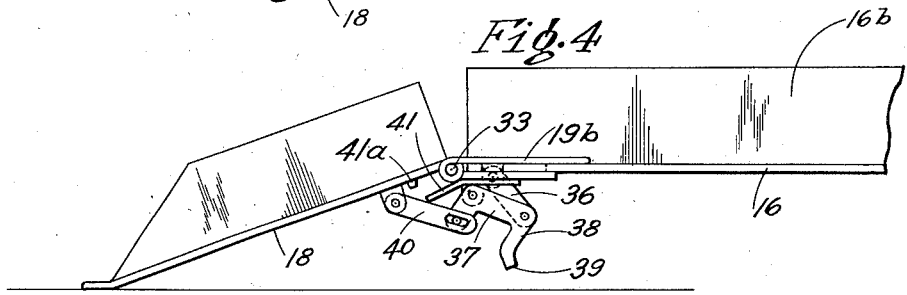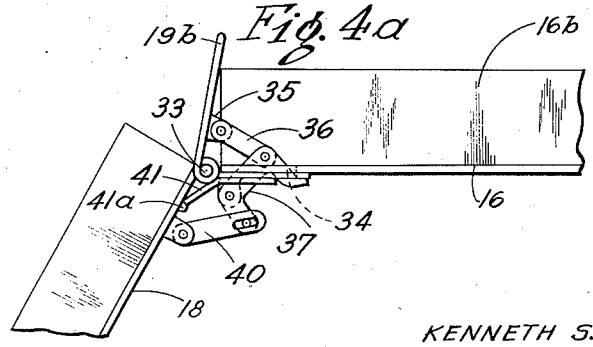

Oct. 30, 1934.   K. S. CLAPP   1,978,622
AUTOMATIC CHOCK FOR VEHICLE LIFTS
Original Filed Aug. 18, 1930   3 Sheets—Sheet 3

Inventor
KENNETH S. CLAPP
By Richey & Watts
Attorneys

Patented Oct. 30, 1934

1,978,622

UNITED STATES PATENT OFFICE 1,978,622

AUTOMATIC CHOCK FOR VEHICLE LIFTS

Kenneth S. Clapp, Cleveland, Ohio

Original application August 18, 1930, Serial No. 476,029, now Patent No. 1,966,975, dated July 17, 1934. Divided and this application April 24, 1934, Serial No. 722,160

16 Claims. (Cl. 254—93)

This invention pertains to lift mechanism, and more particularly to vehicle hoist safety mechanism adapted to be effective to maintain a vehicle in position on a lift upon operation thereof.

The present application is a division of my co-pending application Serial No. 476,029, filed August 18, 1930 patented July 17, 1934 as Patent No. 1,966,975.

The primary object of the present invention is to provide automatically operating means for effecting a braking or chocking action with respect to a vehicle on a lift which is safe, positive and reliable in operation and relatively simple in construction, and which forms a part of, or is incorporated in the lift assembly.

Another object of the invention is to provide in a vehicle lift means of a pneumatic or fluid actuated type for automatically effecting chocking of a vehicle carried or supported by the lift.

Another object of the invention is to provide fluid actuated means for effecting movement of the ramp of a lift and also a chocking device in proper timed relation with the movement of the ramp.

The foregoing and other objects and advantages will become apparent in view of the following description taken in conjunction with the drawings, wherein:

Figure 1 is a fragmentary sectional elevation of a form of actuating mechanism for a vehicle lift of the pneumatic or fluid actuated type;

Fig. 2 is a fragmentary top plan view of a lift which may be used with the mechanism shown in Fig. 1 together with a form of pneumatic or fluid chock operating mechanism; and Fig. 2a is a side elevation of Fig. 2;

Fig. 3 is an enlarged view in side elevation of the one extremity of a lift trackway or platform, showing a preferred type of chocking device and linkage mechanism for operating the same, the lift being shown in its down position; and Fig. 3a is a view similar to Fig. 3, showing the lift as it moves clear of the ground or floor on which it may be disposed;

Figs. 4 and 4a are views similar to Figs. 3 and 3a, showing a modified or alternative type of chocking device and linkage mechanism;

Fig. 5 is a view in side elevation (more or less diagrammatic) of a further form of pneumatic or fluid type of lift and coacting ramp and chock actuating mechanism.

Figure 6:
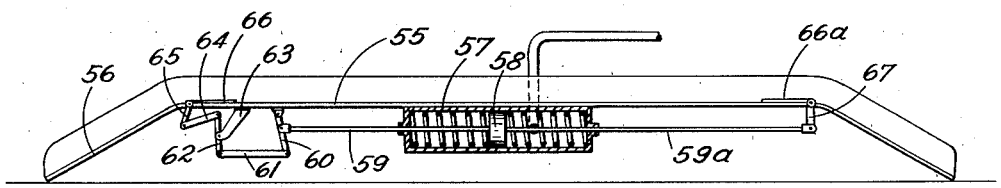
Fig. 6 is a view in side elevation of a lift, showing a further form of chock-operating mechanism applied thereto and partly in section.

Figs. 7 to 10, inclusive, are fragmentary views in section and side elevation of modifications in structure relatively to that shown in Fig. 6.

Referring to the drawings and particularly to Figs. 1 and 2, 5 indicates the under frame of a vehicle lift which is bolted or otherwise suitably secured as at 6 to a closed ram casing 7 and head 8 thereof, the head being provided with an oil fill pipe 9 which is closed by a suitable plug in the head. The bottom of the casing 7 is closed by a head 10 provided with suitably spaced oil ports disposed adjacent an air line 11 which extends through said head and upwardly to a point adjacent the casing 7 when the lift is in lowered position, the air line extending through the outer casing 12 to an air line 11a, the air lines being controlled by a suitable valve, not shown. Bearings 13 and 13a are provided between the casings, and a suitable spacer 14 may be provided for the ram casing.

In operation, air is admitted to the line 11, 11a to a point above the oil level, and the increasing air pressure forces the oil outwardly through the oil ports into the outer casing where further increase in air pressure will cause the oil to raise the ram casing through displacement thereof from the said casing and pressure on the lower head 10.

Referring to Figs. 2 and 2a, 15 indicates a cross head which connects with tracks or run-ways 16 and 16a of sufficient spacing and size to accommodate the average range of vehicles. The tracks 16 may be provided with side flanges 16b to serve as guides for a vehicle moving onto the said tracks. At their ends, the said flanges are apertured to provide a bearing for pins 17, said pins providing a pivot or hinge for approaches or ramps 18 and 18a and also chock plates 19 and 19a which are raised into vehicle-blocking position through lowering of the ramps. The ramps 18 and 18a may also be provided with side guides or flanges 18b.

The ramps 18 and 18a are each provided with linkage mechanism which is actuated from a fluid cylinder having a piston therein operatively connected to said linkage mechanism whereby when the lift is raised, the ramps are dropped and the chocks brought into position to block a vehicle on the lift. An air connection 20 is provided at the top of the ram casing, preferably above the outlet of the air line 11. This line 20 may or may not be provided with a reducing valve 21, permitting air to flow through the line only at a certain pressure, the said line being connected to a cylinder 22 secured at 23 to the flange 16a of the track 16. The cylinder 22 is provided with a piston 23 having a piston rod 24 secured to and operable therewith. A lever 25 is pivoted at one end to the piston rod 24 and at its opposite end to a link 26 which in turn is pivoted to the ramp 18. The lever 25 is fulcrumed at an intermediate point to a bracket 27 secured to the trackway 16.

Referring to Figs. 3 and 3a, each of the chocks 19 and 19a is actuated by movement of the ramps 18, 18a through the medium of linkage mechanism which in the form shown consists of a crank arm 28 pivoted to the one end of a link 29, the latter being pivoted at its opposite end to a crank 30, which in turn is suitably pivotally connected to the track 16. A further link 31 is pivoted at one end to an intermediate portion of the crank 30 and at its opposite end is loosely or slidably pivoted to an arm or bracket 32 connected to the ramp 18. It will be noted that the linkage mechanism for operating the chocks is disposed wholly beneath the ramp and track and is arranged in a manner such as to collapse when the lift is lowered and not interfere with the action of the latter.

The type of linkage mechanism shown in Figs. 3 and 3a may be advantageously used to connect the ramps 18 and tracks 16 in the lift mechanism shown in Figs. 2 and 2a. In operation, introduction of compressed air into the ram casing to raise the same causes air to flow to the cylinder 22 through the connection 20, causing outward movement of the piston 23. This outward movement of the piston causes operation of the crank 25. As the lift moves upwardly the ramps are lowered, and after lost play is taken up in the links 31, the chocks 19, 19a are raised, note the position of the linkage mechanism and chock in Fig. 3a. In this latter figure, the braking position of the chock is shown as vertical, but it will be understood that the links may be proportioned to move the chock to any desired intermediate position, and to this end certain of the links may be made extensible.

Downward movement of the lift will not effect movement of the chock until the lift has reached its lowered position, at which time the piston will be urged towards its inoperative position by contact of the ramp with the ground or by suitable spring (not shown), which may be adapted to be compressed by operative movement of the piston, and the air will of course be fed through the ram casing in a manner similar to the air operating the lift mechanism so that a safety feature is provided in that the chock can not be lowered until the lift has reached its lowered position. In this and other forms of the apparatus, the cylinder may be provided with a valve controlling the line 20 whereby air will not be exhausted back through said line, the valve being controlled by a plunger operable manually or by contact with the ground or floor when the lift is lowered, whereby air will be exhausted from said cylinder to lower the chock.

In Figs. 4 and 4a, the chocks 19b are provided with means whereby when they are moved to their raised position they are positively locked against displacement. In this type of chock mechanism, each of the tracks 16 and 16a is provided with ramps having a common pivot 33 for both the chock and ramp. The track is slotted adjacent the end thereof as at 34 to accommodate a downwardly extending bracket 35 formed on the chock, the said bracket being pivoted to a link 36 which is pivoted to a bell crank 37 having an arm 38 provided with a stop portion 39 adapted to engage the track and limit upward movement of the chock. The bell crank 37 is pivoted to a suitable hinge member carried by the track. The one arm of the bell crank 37 is loosely pivoted to a link 40 which in turn is pivotally connected to the ramp 18. A stop 41 is also provided on the track 16 and is adapted to contact a shoulder or lug 41a provided on the under side of the ramp so that undue strain will not be put on the linkage.

The form of mechanism shown in Figs. 4 and 4a operates as follows: When the lift is in lowered position with the ramp contacting the ground or floor surface, as shown in Fig. 4, the chock 19b will be lowered to permit a vehicle to move upwardly on the ramp and onto the track 16. When the track is raised, the ramp will assume a downwardly inclined or lowered position, as shown in Fig. 4a, this downward movement of the ramp being positively limited by contact of the stop 41 with the lug 41a. Downward movement of the ramp causes the bell crank 37 to turn in a counter-clockwise direction until the stop 39 contacts the under side of the track 16, and simultaneously moves the chock 19b to its obstructing position. While a certain raised position of the chock 19b has been illustrated, it will be understood that the linkage mechanism may be varied or made extensible for the purpose of obtaining any desired elevation of the chock.

With the type of linkage mechanism above described, the chocks may be tilted to any desired angle and held positively at that angle when serving to block movement of a vehicle.

Figure 5A:
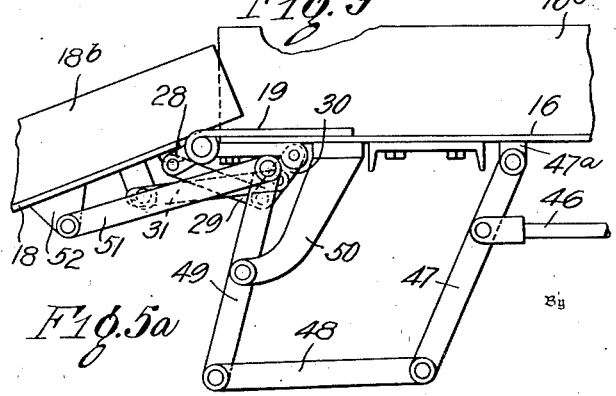
Fig. 5a is an enlarged detail view of one of the chock extremities of Fig. 5 to show certain of the parts more clearly.

In Figs. 5 and 5a, the track 16 is provided with a ramp 18 hinged thereto. A pneumatic cylinder 42 is provided with a normally centered piston 43 urged to central position by expansion springs 44 and 44a. The piston is adapted to be operated towards the left as viewed in Fig. 5. An air line 45 is connected to the right end of the cylinder 42 and leads to the ram cylinder described in connection with Fig. 1. A piston rod 46 is loosely connected to a lever 47 which is pivoted to the track at 47a, the opposite end of the lever 47 being pivoted to a link 48 which in turn is pivoted to the outer end of a lever 49, the latter being pivoted or fulcrumed intermediate its ends to a bracket 50 secured to the under side of the track 16. The inner end of lever 49 is pivoted to a link 51 which in turn is pivoted to a bracket 52 on the ramp 18. The opposite end 46a of the piston rod 46 is loosely connected to a lever 53 which is pivoted to the track 16 at 53a. The outer end of lever 53 is pivoted to a link 54 which is pivoted to a bracket 55 provided on the ramp 18. Movement of piston 43 toward the left as viewed in Fig. 5 moves levers 47 and 49 in a clockwise direction, causing ramp 18 to be lowered and consequently raising the chock 19, not shown in Fig. 5. The linkage mechanism for raising the chock is the same as that shown in Figs. 3 and 3a. The device is shown in full in Fig. 5a and the members of the linkage mechanism which are identical with those of Figs. 3 and 3a have like reference characters and require no further description here. The opposite ramp and chock are moved similarly as the lever 53 is also moved in clockwise direction.

In the types of lifts shown in Figs. 6 to 10, inclusive, the track is indicated at 55 and the ramp at 56, the ramp being formed rigid with or as part of the track 55.

In Fig. 6, an air or fluid cylinder 57 is provided having a piston 58 mounted therein provided with piston rods 59 and 59a. The piston rod 59 is pivotally connected to a link 60 which in turn is pivoted at one end to the under side of the track 55 and at its opposite end is pivoted to a link 61. Link 61 is pivoted to the one end of a lever 62 which is fulcrumed at an intermediate point to a bracket 63 provided on the under side of the track, the opposite end of lever 62 being pivoted to a link 64 which in turn is pivotally connected to an arm or crank 65 connected to a chock 66. Rod 59a is pivoted to a crank 67 which is connected to a chock 66a. Movement of piston rod 59 towards the left as viewed in Fig. 6 turns the arm or crank 65 and swings chock 66 upwardly into position, and a similar movement of rod 59a turns crank 67 and also raises chock 66a.

Figures 7, 8:
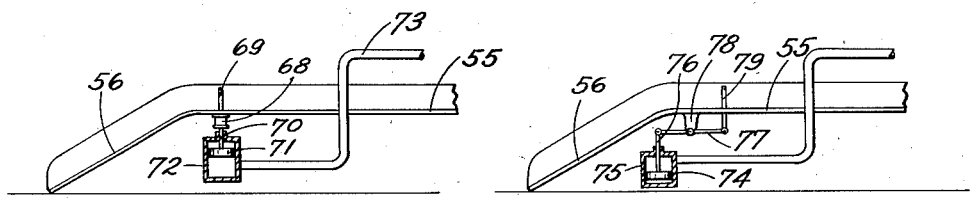

In the form shown in Fig. 7, the track 55 is slotted and provided with a suitable guide 68 to receive a chock 69 which is connected for substantially vertical movement to a piston rod 70 and piston 71 mounted in a cylinder 72. Air or fluid under pressure is conducted to the cylinder 72 through a line 73. When fluid pressure is admitted to cylinder 72, upward movement of the piston 71 causes the chock 69 to move upwardly into wheel blocking position, and downward movement of the piston causes retraction of the chock. The piston may be urged downwardly by a spring member (not shown).

In the form shown in Fig. 8, a short stroke piston 74 is disposed in a cylinder 75. A piston rod 76 is pivotally connected to a crank or lever 77, the latter in turn being pivoted to a bracket 78 carried by the track 55. A chock 79 is pivoted to the one end of crank 77. Downward movement of piston rod 76 causes the chock to be moved upwardly and vice versa. The arms of lever or crank 77 may be of any suitable proportions to obtain the proper relative movement between the piston 74 and chock 79.

Figures 9, 10:
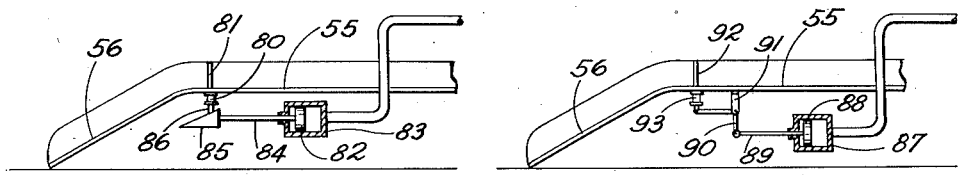

In the form shown in Fig. 9, the track 55 is provided with a slotted guide 80 through which a chock 81 has movement. A piston 82, disposed in a cylinder 83, has connected thereto a rod 84 which has fixed to the outer end thereof a cam 85 adapted to act on a coacting contact member 86 which is connected to the chock 81. Outward movement of piston 82 imparts like movement to cam 85 and raises the chock 81, while retraction of the cam 85 lowers the chock.

In the form shown in Fig. 10, a cylinder 87 is provided and has mounted therein a piston 88. A connecting rod 89 is connected at one end to the piston and at its opposite end to a bell crank 90 which is pivoted to a bracket 91 carried by the track 55. Bell crank lever 90 has connected thereto a chock 92 adapted to move in a guide 93. Movement of the piston towards the left, as viewed in Fig. 10, causes upward movement of the chock 92, while movement in the opposite direction of said piston, exhausting the actuating fluid, causes movement in a downward direction of the chock.

It will be understood that in Figs. 5 to 10, inclusive, the parts are shown more or less diagrammatically, and that chocks on the opposite track (not shown in these figures) may be suitably connected for operation from one cylinder, or individual cylinders may be used for operation of one or more individual chocks, as desired.

It will be understood that I do not wish to be limited by the exact embodiments of the device shown, and that various other forms of the device will be rendered apparent to those skilled in the art in view of the foregoing description and disclosure in the drawings, without departing from the spirit of the invention and scope of the appended claims.

I claim:

1. In combination, a vehicle lift having a trackway, a chocking device associated with the trackway, a fluid operated member for actuating the lift, a fluid operated member for actuating the chocking device and means for substantially simultaneously actuating the lift and chocking device.

2. In combination, a power actuated vehicle lift, a chocking device carried thereby, and fluid operated means for automatically operating the chocking device when the power is applied for raising the lift.

3. In combination, a vehicle lift having a trackway, a chocking device carried by and movable with reference to the trackway, fluid operated means for actuating the lift, a fluid operated member mounted on the trackway for moving the chocking device into the path of a vehicle on the lift, and other means acting on said member for moving the chocking device to inoperative position when the first mentioned means is inoperative.

4. In combination, a vehicle lift having a trackway thereon, a chocking device carried by the trackway, and fluid operated means associated with the lift, and mechanism operatively connecting said means to the chocking device, said mechanism including a stop which operates to prevent working stresses on the chocking device from being transmitted to the fluid operated means.

5. In combination, a vehicle lift, a trackway thereon, a chocking member forming part of the trackway and movable into the path of a vehicle on the trackway, fluid operated means carried by the trackway, and a system of linkage operatively connecting the member and said means.

6. In combination, a vehicle lift having a trackway, a chocking member carried thereby, a cylinder carried by the trackway, a piston operable within the cylinder, fluid means for actuating the piston, and mechanism operatively connecting the piston and member, whereby the member is moved into the path of a vehicle on the trackway when the piston is moved in one direction, and is moved out of the path of the vehicle when the piston is moved in the opposite direction.

7. In combination, a fluid actuated lift, a fluid actuated chocking device and a common source of fluid supply for actuating the lift and chocking device.

8. In lift mechanism, the combination of a track, a chock disposed adjacent said track, and pneumatic means for moving said chock to a raised position with respect to said track.

9. In lift mechanism, the combination of a track, a chock hinged thereto, and pneumatic means for moving said chock to a raised position with respect to said track.

10. In lift mechanism, the combination of a track, an approach portion and a chock movable with respect thereto, and pneumatic means for moving said approach portion to inoperative position and for moving said chock to a raised position with respect to said track.

11. In lift mechanism, the combination of a track, means for raising said track including pneumatic means, a chock associated with said track, and pneumatic means associated with said first named pneumatic means for moving said chock to a raised position with respect to said track.

12. In lift mechanism, the combination of a track, a movable member associated with said track adapted to be moved to obstructing position with respect to said track, means for moving said member to obstructing position, including a lever member operable by a pneumatic member.

13. In lift mechanism, the combination of a track, a chock disposed adjacent said track, and pneumatic means operable in the direction of operation of said chock for moving said chock to a raised position with respect to said track.

14. In lift mechanism the combination of a track, a chock, an approach portion connected to said chock to cause movement thereof, a fluid cylinder having a piston and piston rod, a pair of cranks connected to said approach and piston rod whereby movement of said piston moves said chock, and a piston rod connected to said piston and to a crank connected to another approach controlled chock whereby corresponding movements of said chocks are effected.

15. In lift mechanism the combination of a track, a chock, a fluid cylinder having a piston and piston rod, a pair of cranks connected to said chock and piston rod whereby movement of said piston moves said chock, and a piston rod connected to said piston and to a crank connection to another chock whereby corresponding movements of said chocks are effected.

16. In lift mechanism, the combination of a track, a chock movable with respect thereto, a crank connected to said chock, and pneumatic means connected to said crank for controlling movement of said chock.

KENNETH S. CLAPP.